Nov. 24, 1925.
J. P. SNEDDON
BAFFLE
Filed April 5, 1921   3 Sheets-Sheet 1
1,562,476
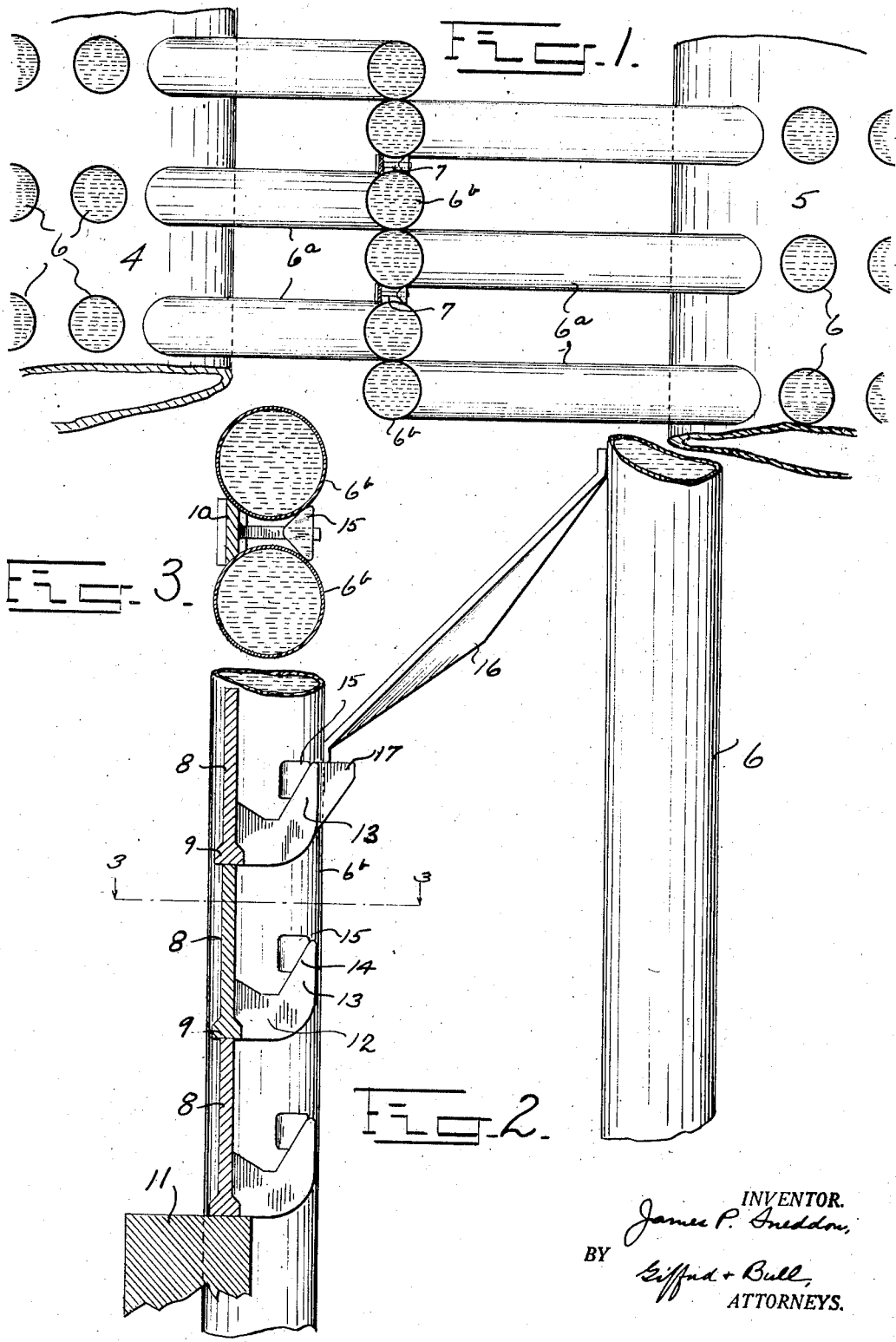
INVENTOR.
James P. Sneddon,
BY Gifford + Bull,
ATTORNEYS.

Nov. 24, 1925.

J. P. SNEDDON

BAFFLE

Filed April 5, 1921

1,562,476

3 Sheets-Sheet 2

INVENTOR
James P. Sneddon
BY
Gifford & Bull,
ATTORNEYS

Nov. 24, 1925. 1,562,476
J. P. SNEDDON
BAFFLE
Filed April 5, 1921 3 Sheets-Sheet 3
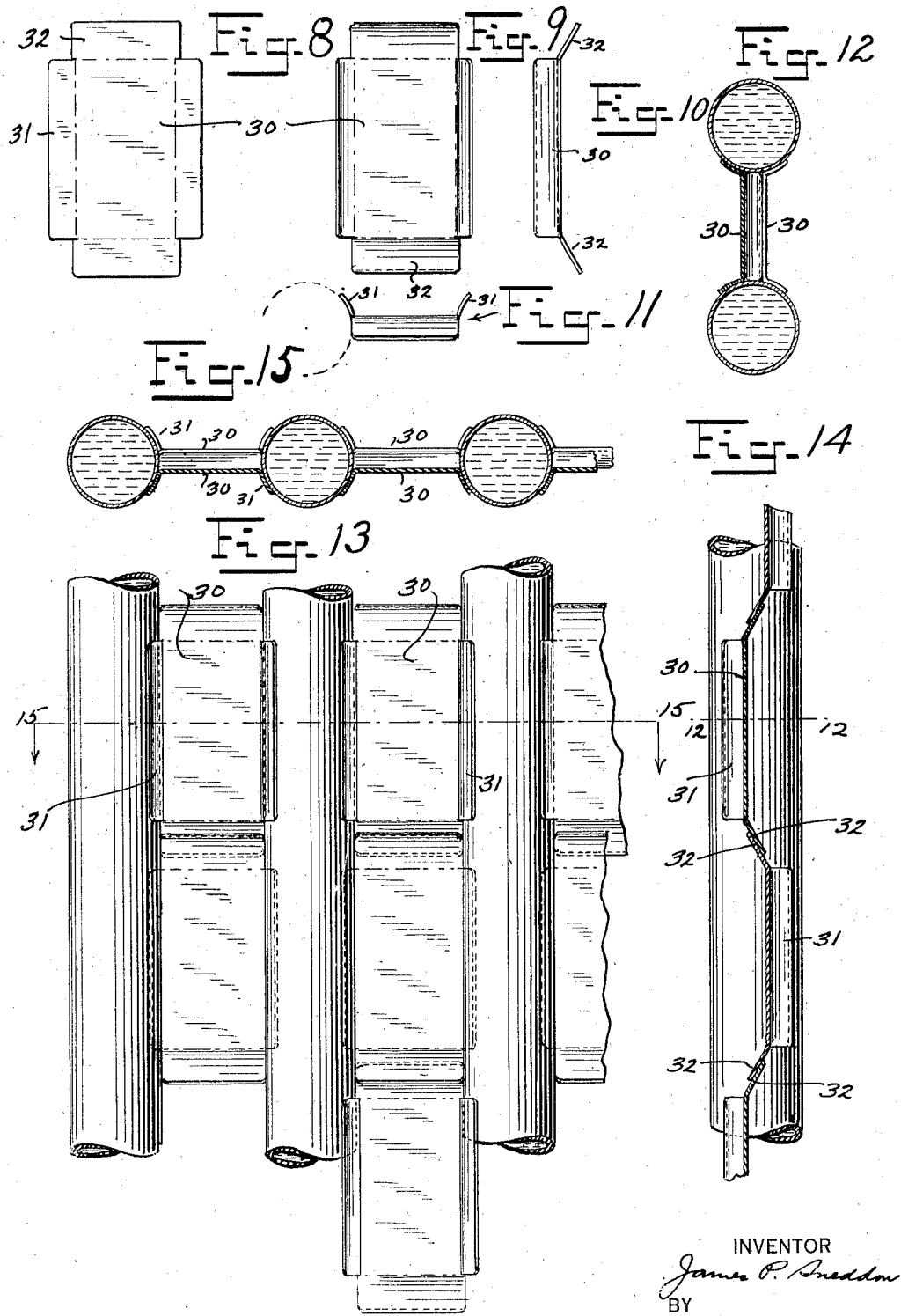

Patented Nov. 24, 1925.

1,562,476

UNITED STATES PATENT OFFICE.

JAMES P. SNEDDON, OF BAYONNE, NEW JERSEY, ASSIGNOR TO THE BABCOCK & WILCOX COMPANY, OF BAYONNE, NEW JERSEY, A CORPORATION OF NEW JERSEY.

BAFFLE.

Application filed April 5, 1921. Serial No. 458,844.

*To all whom it may concern:*

Be it known that I, JAMES P. SNEDDON, a citizen of the United States, residing in Bayonne, in the county of Hudson and State of New Jersey, have invented certain new and useful Improvements in Baffles, of which the following is a specification.

My present invention relates to baffles for use in connection particularly with water tube boilers in which the baffle extends parallel to the axes of the tubes.

One of the objects of my invention is to provide a baffle which may be built up of separate pieces or plates, each of which will be locked to the tubes. Another object of my invention is to provide such a baffle in which, by reason of the close contact between a considerable area of each of the plates or pieces, it will be possible to make such pieces of metal, such as cast iron or steel, without danger of the baffle being destroyed by the high heat such as is found, for instance, in the first pass of a modern water tube boiler. Another object of my invention is to provide such a baffle in which the pieces will contact with the tubes on one side of the plane of the axes of the tubes and will be engaged by members contacting with the tubes on the opposite side of this plane, the whole being arranged so that the plates constituting the baffle will be drawn tightly against the tubes which they engage.

With these and other objects in view, my invention consists of the constructions and arrangements hereinafter described and more specifically pointed out in the appended claims.

For purposes of illustration, I have shown my baffle applied to the tubes of a Rust boiler which, as is well understood, are vertical. It will be understood, however, that the same construction may be applied to either vertical or horizontal tubes where it is desired to provide a baffle extending in the directing of the axes of the tubes.

Figure 5:
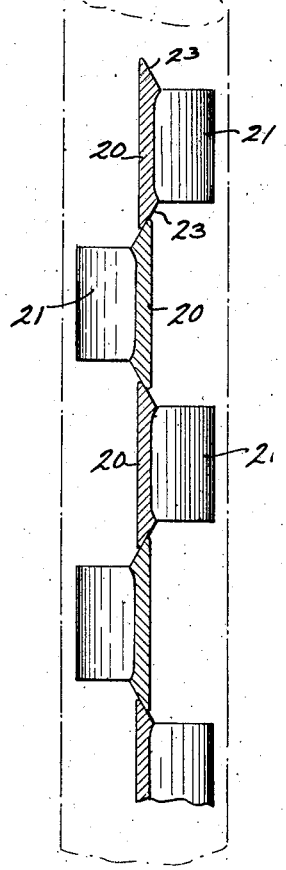
Figure 4:
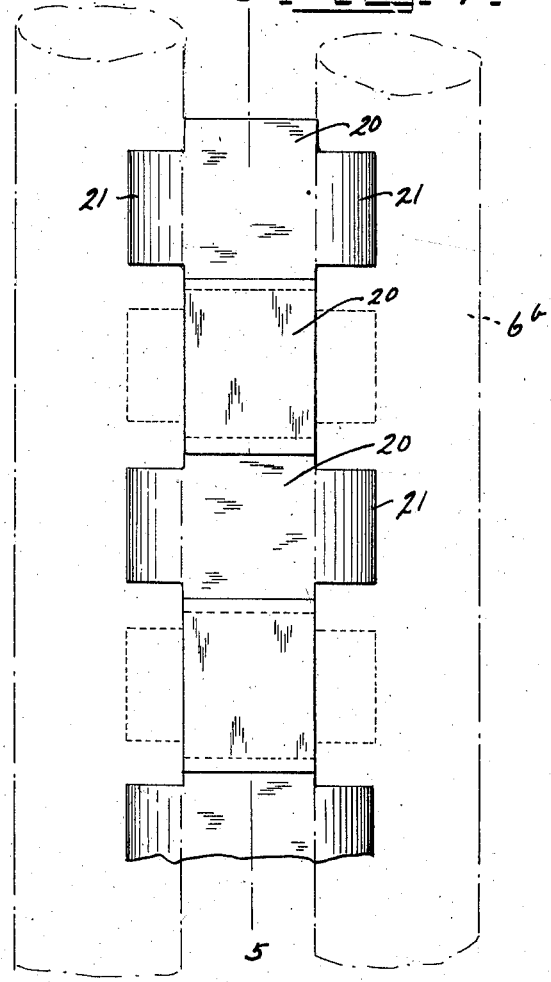
Figure 7:
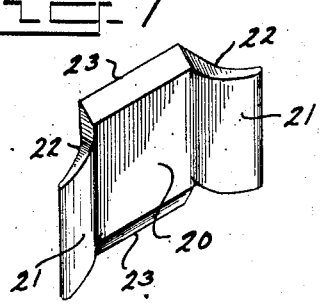
Figure 6:
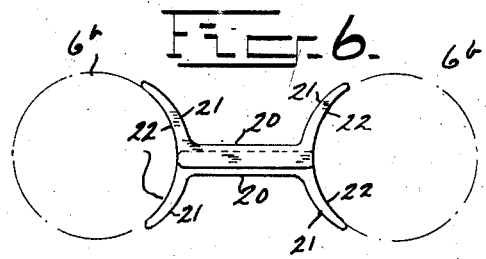

In the drawings, Figure 1 represents a sectional view of a portion of a Rust boiler which I have adopted for purposes of illustration, the section being taken on line 3—3 of Fig. 2; Fig. 2 is an enlarged fragmentary sectional elevation of a portion of Fig. 1 showing one form of my invention; Fig. 3 is a section of Fig. 2 on the line 3—3; Figs. 4 and 5 are, respectively, side and sectional elevations of another form of my invention, Fig. 5 being taken on line 5—5 of Fig. 4; Fig. 6 is a plan view of Fig. 4; Fig. 7 is a perspective view of a detail of Figs. 4 and 5; Figs. 8, 9, 10 and 11 are, respectively, front and rear views, side view and bottom view of another form of plate similar to that shown in Figs. 4 to 7, inclusive, but made of relatively thin sheet metal; Fig. 12 is a section on the line 12—12 of Fig. 14, showing a pair of tubes with the plates of Figs. 8 to 11, inclusive, in position; Figs. 13 and 14 are front and side elevations, respectively, of a portion of a baffle made up of the plates shown in Figs. 8 to 11, inclusive, and Fig. 15 is a section on the line 15—15 of Fig. 13 looking in the direction of the arrows.

In the drawings corresponding reference characters indicate corresponding parts.

In the illustrative form shown in Fig. 1, 4 and 5 are portions of the lower water drums having vertical tubes 6, 6, each drum being also provided with a row of tubes $6^a$ which are bent at their lower and upper ends, the center portions being vertical and parallel, as shown at $6^b$. In this form of boiler the gases are divided so that they pass upwardly at the right of tubes $6^b$ and then downwardly at the left of the same, as viewed in Figs. 1 and 2. In such a boiler, therefore, there is provided a baffle between these two passes, and in the form illustrated this baffle is made up in part of the tubes $6^b$ which are caused to contact, and in part of certain baffle members which are used to fill the spaces between the tubes which are spaced apart, as at 7.

In the form illustrated in Figs. 1 to 3 inclusive, these members comprise metallic plates 8 which may be enlarged at their lower ends, as at 9, to form a seat for the plate below, the edges of the plate 8 being curved, as at 10, to contact closely with the walls of the tubes $6^b$. Preferably, in order to produce the best thermal contact between the plates and the tubes, this surface 10 will be formed with considerable accuracy. The series of plates 8 are placed one above the other, the lowermost plate resting on a wall, as at 11. In the form illustrated, the plates 8 are at one side of the plane passing through the axes of the tubes $6^b$, and as one means for holding them against the tubes $6^b$, I provide on each plate a projecting tongue or arm 12 having an upwardly extending portion 13 with a bevelled face 14, the arm 12 being long enough to carry the bevelled portion 14 to the right of the plane passing through the axes of the tubes 6ᵇ, the plates 8 and the bevelled surfaces 14, therefore, lying on opposite sides of that plane.

As a locking means, I provide the pieces 15, each having a bevelled face adapted to cooperate with the bevelled face 14, the pieces 15 being wide enough to contact with the surfaces of the tubes 6ᵇ. It will be clear from an inspection of Figs. 2 and 3 that when the piece 15 is moved downward or in a direction parallel to the axes of the tubes 6ᵇ, the arm 12, and, therefore, the plate 8, will be drawn to the right of Fig. 2 so that the curved surfaces 10 will be drawn into close contact with the surfaces of the tubes. The pieces 15 will also serve to maintain the plates 8 locked in this contacting position. When the tubes 6ᵇ are vertical and the parts are arranged as shown in Figs. 2 and 3, it will be obvious that gravity will tend to move the pieces 15 downward so that any relative motion between a pair of spaced tubes will be immediately taken up by the pieces 15 moving downward by gravity. The whole arrangement, therefore, is a self-locking one.

The baffle just described will be seen to be made up partly of water tubes and partly of, preferably, metallic pieces in close thermal contact with these tubes. Consequently, the heat from the gases will be applied usefully to the water circulating tubes either by passing directly to the walls of the tubes or indirectly by entering the plates 8, and from thence, by conduction, to the walls of the tubes and to the water contained therein. If desired, the plates 8 may be arranged so that the flat portions thereof will be adjacent the hotter gases, while the locking parts are contacted by the cooler gases.

In the form shown in Fig. 2 a supplemental baffle plate 16 extends from the tubes 6 to the tubes 6ᵇ, the lower end of the plate 16 resting on a projection 17 connected to one of the arms 12, and the upper end of the plate resting against the tubes 6. This baffle may serve to divert gases flowing upward along the bank of tubes 6ᵇ back into the bank of tubes 6.

In the form of my invention shown in Figs. 4 to 7 inclusive, the baffle filling pieces are all alike and are arranged so that they will be provided with suitable contacting surfaces whereby when endwise pressure is applied to the plates of the baffle, the several plates will have their curved surfaces drawn closely into contact with the water tubes between which they are placed. In this form of my invention, each plate comprises a relatively thin, flat, rectangular portion 20 whose width is somewhat less than the distance between the spaced tubes, so that the portion 20 may be located substantially in the plane of the axes of the tubes. Extending out from one side of the plate is a pair of curved wings 21, 21, each of which has an inner cylindrical surface 22 of the same diameter as the external diameter of the water tubes, and preferably the wings 21 are of approximately the same length as the flat portion 20.

The upper and lower edges of the flat portion 20 are bevelled, as at 23, 23, these bevelled faces being shaped so that when the plates are in position, as shown best in Fig. 5, with the curved recesses 22 of alternate plates engaging the water tubes on one side of the plane of the axes of the tubes, and the recesses 22 of the remaining plates engaging the same tubes but on the opposite side of that plane, pressure in the direction of the axes of the tubes will tend to draw each of the curved surfaces 22 against its respective tube. This pressure may be supplied by driving the plates down when they are first installed, and when such a construction is applied to a vertical bank of tubes, it will be seen that the weight of the baffle-filling pieces will tend to crowd each of them into close contact with the water tubes.

In the form of my invention shown in Figs. 8 to 15 inclusive, the baffle-filling pieces are in many respects like those shown in Figs. 4 to 7 inclusive, except that the pieces are made of relatively thin sheet metal, so that they can be readily shaped in suitable dies and will also be sufficiently resilient to conform more readily to the curvature of the tubes so as to produce a close and intimate contact between said tubes and the plate forming the baffle. In the form of plate illustrated, only one shape is necessary in order to build up a complete baffle, the plates located on opposite sides of the plane of the axes of the tubes being the same but turned in opposite directions, as shown. The body of the plate 30 is flat and is provided on either edge with wings 31, 31 which are curved to suit the curvature of the tubes with which they are to engage. At the top and bottom of the plate 30 is a bent or bevelled portion 32, which is shown best in Fig. 14, contacting, when the plates are in position, with similar parts of adjacent plates. By reason of the shape of this bevelled portion 32, the longitudinal motion of the plates along the tubes will serve to draw the curved portions 31 against the tubes to form a close metallic contact to carry away the heat from the baffle to the tubes.

If desired, the filling blocks may be made of any suitable refractory material, or they may be made of metal. When the latter material is used, the plates are protected from destruction by the heat because of their close thermal contact with the water tubes.

It will be understood that, if desired, the baffle may be made up of a row of parallel water tubes each spaced from the adjacent tubes with filling pieces covering such spaces, instead of in the manner shown in Fig. 1, in which some of the tubes are spaced and others are in contact.

I claim:—

1. A vertical baffle comprising tubes arranged side by side, some of which are spaced apart, members for filling the spaces between the spaced tubes, and gravity-operated means to draw the members against the tubes and to lock the members in position.

2. A baffle comprising tubes arranged side by side, some of which are spaced apart, filling plates to cover the spaces between the spaced tubes, said plates having portions adapted to contact the tubes at one side of the plane of the axes of the tubes, and gravity-operated means engaging the tubes at the opposite side of said plane to lock the plates in position and to draw them against the tubes.

3. A vertical baffle comprising tubes arranged side by side, some of which are spaced apart, filling plates to cover the spaces between the spaced tubes, said plates having portions adapted to contact the tubes at one side of the plane of the axes of the tubes, and means engaging the tubes at the opposite side of said plane and operating by a downward motion to lock the plates in position.

4. A vertical baffle comprising tubes arranged side by side, some of which are spaced apart, filling plates to cover the spaces between the spaced tubes, said plates having portions adapted to contact the tubes at one side of the plane of the axes of the tubes, and gravity-operated means engaging the tubes at the opposite side of said plane to lock the plates in position and to draw them against the tubes.

5. A vertical baffle comprising tubes arranged side by side, some of which are spaced apart, metallic plates to cover the spaces between the spaced tubes, each plate having curved portions adapted to contact the tubes closely at one side of the plane of the axes of the tubes, and gravity-operated means engaging the tubes at the opposite side of said plane to draw the curved faces against the tubes and lock them in position.

6. A vertical baffle comprising tubes arranged side by side, some of which are spaced apart, metallic plates to cover the spaces between the spaced tubes, each plate having curved portions adapted to contact the tubes closely at one side of the plane of the axes of the tubes and for substantially the length of the plates, and gravity-operated means engaging the tubes at the opposite side of said plane to draw the curved faces against the tubes and lock them in position.

7. A vertical baffle comprising tubes arranged side by side, some of which are spaced apart, metallic plates to cover the spaces between the spaced tubes, each plate having curved portions adapted to contact the tubes closely at one side of the plane of the axes of the tubes and for substantially the length of the plates, each plate having a bevelled surface at one end in contact with a bevelled surface on the next adjacent plate, said bevelled faces being constructed and arranged to cause the curved faces to be drawn against the tubes by the weight of the plates above said bevelled faces.

8. A vertical baffle comprising tubes arranged side by side, some of which are spaced apart, members for filling the space between the spaced tubes, each of said members comprising a plate located substantially in the plane of the axes of the tubes and having a pair of curved wings extending from the same side of the plate and each wing adapted to engage a tube at one side of said plane, said plates being positioned along the tubes end to end with the wings of alternate plates on one side of said plane and the wings of the remaining plates on the opposite side of said plane, the ends of the plates being bevelled at an angle to cause the weight of the plates above said bevelled ends to draw all of the curved wings against the tubes.

9. A vertical baffle comprising tubes arranged side by side, some of which are spaced apart, members for filling the space between the spaced tubes, each of said members comprising a metallic plate located substantially in the plane of the axes of the tubes and having a pair of curved wings extending from the same side of the plate and each wing adapted to engage a tube closely at one side of said plane for substantially the length of the plate, said plates being positioned along the tubes end to end with the wings of alternate plates on one side of said plane and the wings of the remaining plates on the opposite side of said plane, the ends of the plates being bevelled at an angle to cause the weight of the plates above said bevelled ends to draw all of the curved wings against the tubes.

10. A baffle member comprising a relatively thin metallic plate with a pair of curved wings extending along opposite edges parallel to the face of the plate, the walls of each of the wings being adapted to fit closely against the convex surface of one of a pair of spaced parallel tubes.

11. A baffle member comprising a relatively thin metallic plate with a pair of curved wings extending along opposite edges parallel to the face of the plate, the walls of each of the wings being adapted to fit closely against the convex surface of one of a pair of spaced parallel tubes, a portion of the plates being adapted to lie between the tubes in the plane of their axes and the curved recesses extending around the tubes on the same side of said plane.

12. A baffle member comprising a relatively thin metallic plate with a pair of curved wings extending along opposite edges parallel to the face of the plate, the walls of each of the wings being adapted to fit closely against the convex surface of one of a pair of spaced parallel tubes, the plate having a lock-engaging surface extending at an angle to the face of the plate.

13. A baffle member for spaced parallel tubes comprising a relatively thin metallic plate having a flat portion of a width approximately equal to the distance between the spaced tubes and a pair of curved wings extending out from either side of the flat portion and having cylindrical inner surfaces adapted to fit closely against the walls of the tubes.

14. A baffle member for spaced parallel tubes comprising a relatively thin metallic plate having a flat portion of a width approximately equal to the distance between the spaced tubes and a pair of curved wings extending out from either side of the flat portion and having cylindrical inner surfaces adapted to fit closely against the walls of the tubes, the tops and the bottoms of the wings being substantially in alignment respectively with the top and the bottom of the flat portion of the plate.

15. A baffle member for spaced parallel tubes comprising a relatively thin metallic plate having a flat portion of a width approximately equal to the distance between the spaced tubes and a pair of curved wings extending out from either side of the flat portion and having cylindrical inner surfaces adapted to fit closely against the walls of the tubes, the top and bottom edges of the flat portion being bevelled.

16. A baffle comprising tubes arranged side by side, some of which are spaced apart, relatively thin metallic members for filling the spaces between the spaced tubes, each member having a pair of curved faces adapted to fit closely over a considerable area against the curved sides of the adjacent tubes to give a good thermal contact between the metallic members and the tubes to prevent said members from being destroyed when subjected to a high temperature, and means to draw the curved faces against the tubes.

JAMES P. SNEDDON.